Dec. 3, 1968 D. F. PASCUA 3,414,869

SOCKET AND CARRIER FOR MULTILEAD COMPONENTS

Filed Oct. 3, 1966

INVENTOR.
DON F. PASCUA
BY
W. H. Maxwell
AGENT

United States Patent Office 3,414,869

Patented Dec. 3, 1968

3,414,869
SOCKET AND CARRIER FOR MULTILEAD COMPONENTS

Don F. Pascua, 19323 S. Grandee Ave., Compton, Calif. 90220

Filed Oct. 3, 1966, Ser. No. 583,613
8 Claims. (Cl. 339—193)

ABSTRACT OF THE DISCLOSURE

This invention relates to a test socket for the reception and handling of small multilead electronic components, and provides a carrier that guidedly receives the multiplicity of leads projecting from an electrical component so as to maintain a separation between said leads and in order to support said component, while presenting a manually engageable part for mechanical insertion into a service receptacle, and all of which is useful in the production and testing of the circuits or like situations, where repeated insertions and/or handling of electrical components is required.

With the advent of solid state of circuitry, miniaturization has taken place with the manufacture of wide varieties of composite electronics incorporated in a single component having multileads for conducting to other circuits. For example, it is not uncommon to have as many as fourteen leads from a single component body, and all of which emanate from a ¼-inch diameter configuration. Therefore, the said leads are rather slender and substantially flexible and are necessarily difficult to see and handle, unless care and dexterity are exercised. More than this, however, the testing of such electronic components requires the repeated connection of these multileads with test equipment, and this is ordinarily accomplished by the provision of a receptacle in a test panel for the reception of a test plug that receives and carries the multilead component. However, in actual practice there are at least two major defects in the ordinary receptacle-carrier equipment. Firstly, the multileads are not easily aligned with the proper connections; that is, they are not readily separated for independent contact. And secondly, the repeated installation of the carrier or carriers in a receptacle results in deterioration and frequent malfunction and failure of the said receptacle-carrier combination. Needless to say, testing cannot be relied upon when faulty equipment is likely to be involved, and which requires constant vigilance over and frequent replacement of the receptacles and carriers of the test equipment. It is therefore an object, primarily, to provide a carrier adapted to facilitate the alignment and reception of multileads from miniature electronic components, and secondarily, to provide a reliable receptacle and plug-carrier that is not subject to failure as a result of repeated installations.

An object of this invention is to provide a guide that facilitates the entry of multileads into correspondingly arranged connector openings. With the present invention, the closely related miniature groupings of separated and usually circularly arranged and parallel conductors are directed to the proper and corresponding connections in a carrier, to be electrically married to the circuitry of the carrier and to be supported in the carrier. With the present invention, any misalignment is readily detected and proper alignment effected by simple manipulation which inherently corrects any misalignment. Further, with the present invention, corrected alignment is maintained upon its establishment, prior to movement that makes the electrical contacts with the carrier circuitry.

Another object of this invention is to provide a receptacle and carrier combination of permanent character, and whereby repeated installations are possible with no danger of discontinuity in any one of the electrical circuits involved. With the present invention, the carrier circuitry is reliably continued into the receptacle, and any normal wear is compensated for in the arrangement of the male and female elements that are especially provided for this purpose.

The various objects and features of this invention will be fully understood from the following detailed description of the typical preferred form and application thereof, throughout which description reference is made to the accompanying drawings, in which.

Figures 1, 2, 3, 4, 5:
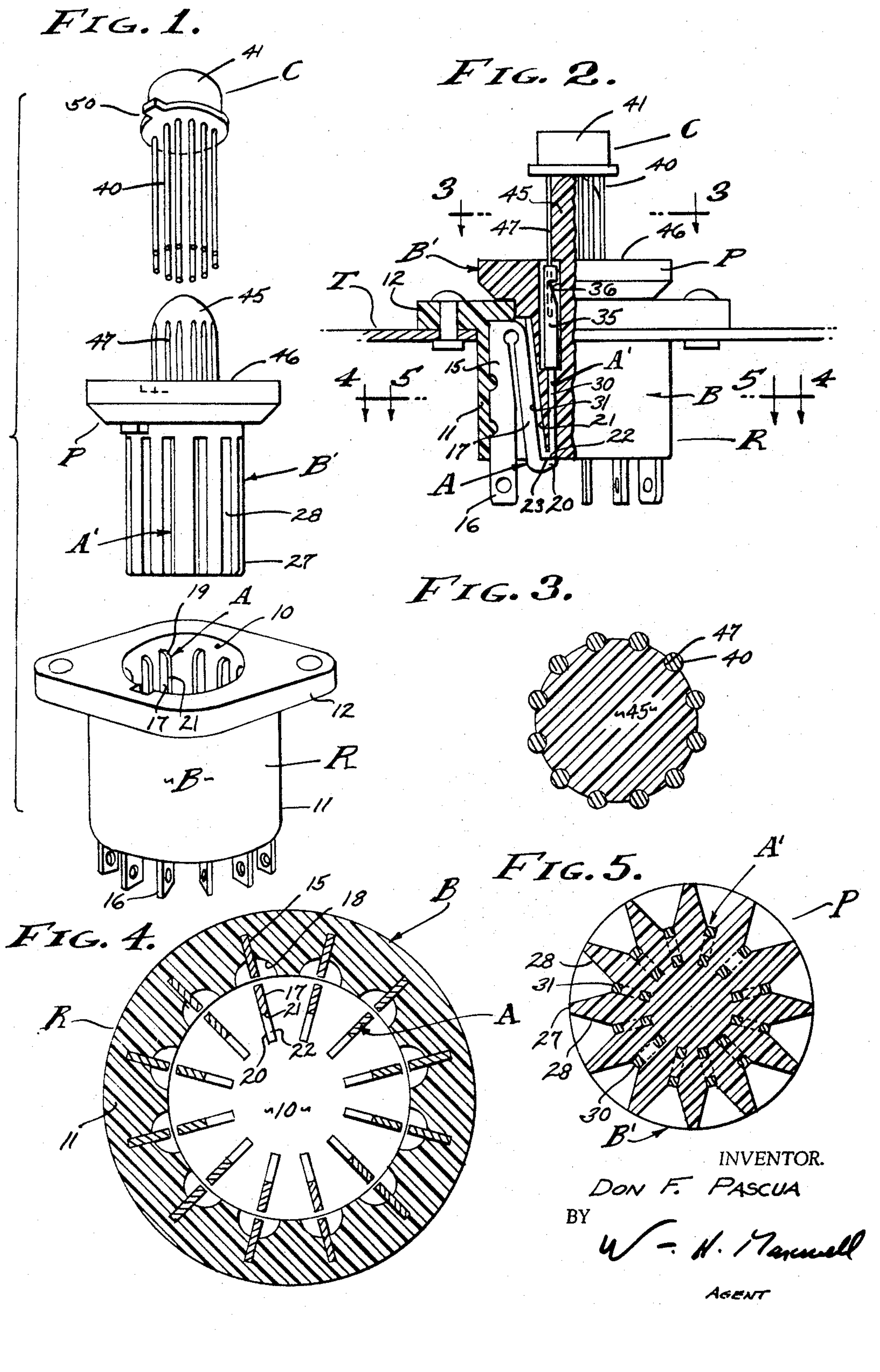
FIG. 1 is an exploded view showing the socket, carrier and multilead component in perspective.
FIG. 2 is an assembly view of the parts shown in FIG. 1, one side portion thereof being in section and the other side portion thereof being shown in elevation.

FIGS. 3, 4 and 5 are enlarged sectional views taken substantially as indicated by lines 3—3, 4—4 and 5—5 on FIG. 2.

As is shown, the present invention is particularly useful in testing equipment wherein plug-carriers are repeatedly inserted into the receptacle of a test panel. Therefore, I will describe the invention as it relates to test equipment of the type under consideration, it being understood that the conductor guiding features and the socket and receptacle features can each be individually employed as circumstances require. In the drawings I have shown a test panel T in which a receptacle R is permanently installed for the repeated reception of a plug-carrier P that is adapted to guidedly receive and support the electronic component C. The test panel T can vary widely and can include various switches and devices and detectors therefor (none of which are shown). Simply, the test panel T is a flat planar element with a opening therethrough and through which the receptacle R is exposed, and behind which the receptacle is wired to the various switches and devices and indicators referred to above. The said receptacle R and the plug-carrier P are mated female and male structures that are combined for substantially unlimited repeated installations with the components C carried and electrically coupled to the circuitry wired to the receptacle as above indicated. For purpose of illustration, I will show a twelve conductor embodiment wherein the receptacle R, plug-carrier P and component C each have twelve conductors for repeated electrically conductive engagement.

The receptacle R and plug-carrier P are a female and male combination comprised a multiplicity of like and preferably identically engaged contacts. The female receptacle R comprises, generally, a body B and a multiplicity of contacts A, while the male plug-carrier P comprises, generally, a body B′ and a multiplicity of contacts A′. The parts B and B′ and A and A′ are complementary as is clearly indicated and shown.

The body B of the receptacle is an elongated part of substantial depth and is characterized by a central cavity or opening 10 therein. The opening 10 is preferably cylindrical and is defined by a circular wall 11 carried by a flange 12. In the case illustrated, the flange 12 is at the front or access end of the receptacle and at which end the flange mounts the receptacle to the test panel T. In carrying out the invention the body B is molded or otherwise formed of a dielectric material into which the contacts A are securely embedded, and in such manner that the said contacts are electrically isolated from the test panel and one from the other.

The contacts A are alike and preferably identical, as above indicated, and each involves generally an anchor 15, a terminal 16 and a contact arm 17. A preferred configuration of the contact A is shown, wherein the anchor is a longitudinally disposed part embedded in the circular wall of the body B, with the terminal 16 exposed at the exterior of the body, and with the contact arm 17 exposed at the interior of the body. The exposure of the terminal 16 is at the back or innermost end of the body B for solder connecting or the like, the terminal 16 being in the form of a typical solder lug; while the exposure of the contact arm 17 is within and protected by the body B.

In accordance with the invention, the body B is provided with a longitudinally disposed inwardly opening channel 18 at the inner face of the circular wall 11, the contact arm 17 being freely accommodated in said channel 18 to move radially. In practice, the parts 15, 16 and 17 are formed of a resilient metal, for example of spring brass, the arm 17 being integrally joined to the anchor at the foremost end thereof by a bend 19 of not more than 180°. The spring arm 17 extends longitudinally within the channel 18, and it extends radially inward from said bend 19 and terminates in a foot 20 at the innermost end of the body B. The contact arm 17 is straight with a downwardly and inwardly tapered contacting face 21, and the foot 20 presents a stop face 22 in a plane normal to the access of the body B.

From the foregoing it will be apparent that a multiplicity of contacts A can be accommodated in a circumferential series of prearranged channels 18, with each contacting face 21 spring biased toward its prescribed inclined position. In practice, one channel can be left blank or devoid, or alternately a keyway or the like is provided at the front of the body B, so as to properly orient the plug-carrier P with the receptacle R.

The body B′ of the plug-carrier P is na elongated barrel-shaped part particularly adapted for manipulation, and is of a length comparable with the length of the body B. That is, the plug-carrier P is formed so as to be received in the cylindrical opening 10 and said plug-carrier and opening 10 are substantially coextensive in form. In accordance with the invention, the contact arm 17 is engageable with circuitry within the carrier-plug P, and for this purpose the contact-arm 17 extends radially inward from the wall 11, projecting out of the channel 18 and thereby exposing the contact faces 21 and 22. Therefore, the body B′ is provided with a longitudinally disposed outwardly opening channel 28 at its outer wall 27, there being a channel 28 opposed to each channel 18. In carrying out the invention, the channel or channels 28 freely and guidedly receive the inwardly projecting contacts A, one channel being left blank or devoid, or alternately a key or the like is provided laterally of the body B′ to engage in the keyway above referred to. Further, the lower portions of the channels 28 are open so as to receive and/or accommodate the inwardly projecting feet 20 of the contacts A. The body B′, like the body B, is molded or otherwise formed of a dielectric material into which the contacts A′ are securely embedded, and in such manner that such contacts are electrically isolated from each other.

The contacts A′ are alike and preferably identical, as above indicated, and each involves a contact bar 30 and socket 35. A preferred configuration of contact A′ is shown, wherein the parts 30 and 35 thereof are longitudinally disposed, electrically interconnected and located radially relative to each other. The contact A′ is anchored in the body B′ by means of embedding the contact bar 30 with its contact face 31 exposed to engage flatly with the opposed contact face 21 of the contact A. Therefore, the contact bar 30 extends longitudinally and radially inward so as to be inclined or tapered as is the contact arm 17, and so that faces 21 and 31 are parallel and come into flat face to face engagement upon sufficient longitudinal insertion of the plug-carrier P into the receptacle R. The said insertion is limited by the foot 20 with its face 22 that engages flatly against an opposing contact face 23 that is exposed at the innermost extremity of contact A′, in a plane normal to the axis of the structure. The socket 35 of contact A′ freely occupies a socket opening 36 that permits its expansion within body B′ when the pin contact is inserted therein. These pin and socket type contacts are efficient and reliable for repeated connection and disconnection, and are usual in every respect. However, each socket 35 is connected to a corresponding contact bar 30 that is anchored in the body B′ and all of which secures the socket 35 in permanent position.

In accordance with the invention I provide a guide means G that directs a multiplicity of pins 40 from the component C. The pins 40 are carried axially from the component body 41 and are arranged in a circular pattern of equally spaced positions. The positions of these pins 40 is controlling and determines the number and arrangement of contacts A′ and corresponding socket openings 36, and also determines the same number and arrangement of contacts A. In actual practice, the pins 40 are lengthy in proportion to the size of the component body 41, and are most often out of parallel. Consequently, the circular pattern of said pins 40 is not ordinarily maintained, and in fact is but generally established. Therefore, guiding of said pins 40 into the socket openings 36 is a problem of concern and it is the guide means G which facilitates and performs this function. As is shown, I provide a centrally projecting mandrel 45 that extends forwardly from the front 46 of the carrier body B′ said mandrel 45 being of substantial longitudinal extent and tapered as it extends forwardly. In its preferred form, the mandrel 45 is bullet-shaped or elliptically rounded and it is characterized by grooves 47 indented into its exterior. The grooves 47 correspond in number and position to the pins 40 and socket openings 36, and they are cut longitudinally into the surface of the mandrel so as to partially receive, at least, and individually guide the pins 40. As shown, each pin 40 is slideably rested in a groove 47 and is thereby aligned with a socket opening 36.

The socket and carrier, as hereinabove described, is particularly adapted for receiving and carrying multilead components C to be installed and/or tested in a panel T. The utility of this invention commences with the initial reception of the multiplicity of pins 40 in the correspondingly arranged grooves 47. At this initial stage of use, the mandrel 45 spreads the pins to the proper circular pattern and each pin 40 tends to seek its intended groove 47, due to its normal resilience inherent in the metallic pin (very little resiliency being required). In practice, the component is provided with a a suitable marker 50 which is aligned with the key above described, and by this means the circuitry represented by the multiplicity of pins is properly aligned. It will be apparent, as is shown especially in FIG. 3, the multiplicity of pins 40 are frictionally held on the mandrel prior to entry into the socket openings 36, where the individual pins are inspected for engagement or disengagement in their respective grooves 47. In the event that a pin 40 is not so engaged in a groove 47, then it is a simple matter to manipulate said pin 40 circumferentially until it does drop into its groove for guidance, whereupon the component body is depressed and the pins 40 slided into the openings 36 for engagement in respective sockets 35. With the component C carried on the plug-carrier P, there is a durable and reliable body of sufficient size to be handled for installation and/or testing, and whereupon the plug-carrier P is inserted into the receptacle R. The contacts A and A′ are designed to have interferring positions whereby the contact arms 20 are wedged outward due to the sliding and inclined engagement with the contact bars 30. As a result, there is a considerable provision for descrepancy as wear takes place on the contact surfaces 21 and 31, and all of which promotes reliability in maintaining conductive electrical connections with repeated installation of various plugs P into the receptacle R.

Having described only a typical preferred form and application of my invention, I do not wish to be limited or restricted to the specific details herein set forth, but wish to reserve to myself any modifications or variations that may appear to those skilled in the art:

I claim:

1. A carrier for the reception of a multiplicity of pin-shaped leads projecting from an electrical component, said leads being arranged in a circular pattern and substantially parallel one with the other, and including, a body with a multiplicity of socket openings therein and one for the reception of each of said leads, and guide means receiving and holding said leads aligned with their respective openings and comprising a cylindrical mandrel projecting from said body within said circular pattern, said cylindrical mandrel having means for spreading the said leads into circular alignment with the socket openings.

2. The carrier for the reception of a multiplicity of pin-shaped leads as set forth in claim 1 and wherein the mandrel is tapered from the diameter of said circular pattern.

3. A carrier for the reception of a multiplicity of pin-shaped leads projecting from an electrical component, said leads being arranged in a circular pattern and substantially parallel one with the other, and including, a body with a multiplicity of socket openings therein and one for the reception of each of said leads, and guide means receiving and holding said leads aligned with their respective openings and comprising a cylindrical mandrel projecting from said body within said circular pattern, there being grooves disposed longitudinally in the exterior of the mandrel and each slideably receiving a lead and frictionally holding the same in alignment with a socket opening and for spreading the said leads into circular alignment with the socket openings.

4. The carrier for the reception of a multiplicity of pin-shaped leads as set forth in claim 3 and wherein the mandrel is tapered from the diameter of said circular pattern.

5. A socket and carrier for the reception of an electrical connection of a multiplicity of conductors, said conductors being arranged in a circular pattern and substantially parallel with the other; the socket including, an elongate body having a longitudinally disposed carrier receiving opening therein and with a multiplicity of longitudinally disposed channels opening inwardly into said opening, and an electrically conductive contact arm in each of said channels and each having an inwardly disposed contact face; and the carrier including, an elongate body for complimentary reception into said opening in the socket and with a multiplicity of longitudinally disposed channels opening outwardly and each apposed to one of said channels in the socket, and an electrically conductive contact bar in each of said channels and each having an outwardly disposed contact face; the contact faces of the contact arms and contact bars correspondingly converging radially inward and said opposed contact faces thereof being opposed at said apposed channels respectively and sildeably engaged by insertion of said carrier into said socket to have flat tapered engagement respectively.

6. The socket and carrier for the reception of and electrical connection of a multiplicity of conductors as set forth in claim 5 and wherein the contact arms are resiliently biased to press the contact faces thereof inwardly into flat pressured engagement with the opposed contact faces of the contact bars respectively.

7. The socket and carrier for the reception of and electrical connection of a multiplicity of conductors as set forth in claim 5 and wherein the contact arms each has a foot at the bottom of the opening in the socket and with a contact face in a plane normal to the longitudinal axis of the structure, and wherein the contact bars each has a contact face at the bottom thereof and in said plane for flat engagement with the contact face on the contact arm.

8. A socket and carrier for the reception of and electrical connection of a multiplicity of pin-shaped conductive leads from an electrical component, said leads being arranged in a circular pattern and substantially parallel one with the other; the socket including, an elongate body having a longitudinally disposed carrier receiving opening therein and with a multiplicity of longitudinally disposed channels opening inwardly into said opening, and an electrically conductive contact arm in each of said channels and each having an inwardly disposed contact face; and the carrier including an elongate body for complimentary reception into said opening in the socket and with a multiplicity of socket openings therein and one for the reception of each of said leads, and with a multiplicity of corresponding longitudinally disposed channels opening outwardly and each apposed to one of said channels in the socket, guide means receiving and holding said leads aligned with their respective openings and comprising a cylindrical mandrel projecting from said body within said circular pattern, said cylindrical mandral having means for spreading the said leads into circular alignment with the socket openings, and an electrically conductive contact bar with a socket in its corresponding socket opening for reception of a component lead, and each contact bar having an outwardly disposed contact face; the contact faces of the contact arms and contact bars being opposed at said apposed channels respectively and slideably engaged by insertion of said carrier into said socket.

References Cited

UNITED STATES PATENTS

| | | | |
|---|---|---|---|
| 3,325,772 | 6/1967 | Suverkropp | 339—193 |
| 3,336,568 | 8/1967 | Plus | 339—193 |
| 3,348,188 | 10/1967 | Wood | 339—154 X |

FOREIGN PATENTS

| | | |
|---|---|---|
| 903,852 | 8/1962 | Great Britain. |
| 1,021,986 | 3/1966 | Great Britain. |

MARVIN A. CHAMPION, *Primary Examiner.*

JOHN R. MOSES, *Assistant Examiner.*